(12) United States Patent
Artman

(10) Patent No.: US 7,993,779 B2
(45) Date of Patent: Aug. 9, 2011

(54) LOW CONDUCTIVITY CARBON FOAM FOR A BATTERY

(75) Inventor: Diane M. Artman, Westlake, OH (US)

(73) Assignee: GrafTech International Holdings Inc., Parma, OH (US)

( * ) Notice: Subject to any disclaimer, the term of this patent is extended or adjusted under 35 U.S.C. 154(b) by 0 days.

(21) Appl. No.: 12/906,206

(22) Filed: Oct. 18, 2010

(65) Prior Publication Data

US 2011/0027654 A1 Feb. 3, 2011

Related U.S. Application Data

(62) Division of application No. 11/560,447, filed on Nov. 16, 2006, now Pat. No. 7,838,146.

(51) Int. Cl.
*H01M 4/68* (2006.01)
*H01M 4/56* (2006.01)
*H01M 4/14* (2006.01)

(52) U.S. Cl. ........ 429/204; 429/209; 429/228; 429/233; 429/245

(58) Field of Classification Search ............... None
See application file for complete search history.

(56) References Cited

U.S. PATENT DOCUMENTS

| | | | |
|---|---|---|---|
| 3,302,999 A | 2/1967 | Mitchell | |
| 3,933,520 A | 1/1976 | Gay et al. | |
| 3,960,761 A | 6/1976 | Burger et al. | |
| 4,163,349 A | 8/1979 | Smith | |
| 4,425,396 A | 1/1984 | Hartman | |
| 4,628,650 A | 12/1986 | Parker | |
| 4,966,919 A | 10/1990 | Williams, Jr. et al. | |
| 5,047,225 A | 9/1991 | Kong | |
| 5,349,893 A | 9/1994 | Dunn | |
| 5,358,802 A | 10/1994 | Mayer et al. | |
| 5,512,390 A | 4/1996 | Obushenko | |
| 5,888,469 A | 3/1999 | Stiller et al. | |
| 5,945,084 A | 8/1999 | Droege | |
| 6,033,506 A | 3/2000 | Klett | |
| 6,079,175 A | 6/2000 | Clear | |
| 6,103,149 A | 8/2000 | Stankiewicz | |
| 6,291,049 B1 | 9/2001 | Kunkel et al. | |
| 6,532,857 B1 | 3/2003 | Shih et al. | |
| 6,575,075 B2 | 6/2003 | Cohen | |
| 6,588,172 B2 | 7/2003 | Porter | |
| 6,599,621 B2 | 7/2003 | Porter | |
| 6,656,858 B1 | 12/2003 | Cahill | |
| 6,679,157 B2 | 1/2004 | Chu et al. | |
| 6,698,331 B1 | 3/2004 | Yu et al. | |
| 6,705,197 B1 | 3/2004 | Neal | |
| 6,725,616 B1 | 4/2004 | Pease | |
| 6,776,936 B2 | 8/2004 | Hardcastle et al. | |
| 6,833,011 B2 | 12/2004 | Rogers et al. | |
| 6,849,098 B1 | 2/2005 | Joseph et al. | |
| 6,892,507 B1 | 5/2005 | Pease | |
| 6,949,314 B1 | 9/2005 | Hossain | |
| 6,979,513 B2 | 12/2005 | Kelley et al. | |
| 7,033,703 B2 | 4/2006 | Kelley et al. | |
| 2005/0079355 A1 | 4/2005 | Clovesko et al. | |
| 2005/0191555 A1 | 9/2005 | Kelley et al. | |
| 2006/0014908 A1 | 1/2006 | Rotermund et al. | |
| 2006/0159905 A1 | 7/2006 | Shao et al. | |
| 2006/0292448 A1 | 12/2006 | Gyenge et al. | |
| 2008/0118832 A1 * | 5/2008 | Artman ................. | 429/209 |

FOREIGN PATENT DOCUMENTS

WO 2005070642 8/2005

OTHER PUBLICATIONS

Anderson, H., et al., "Microcellular Pitch-Based Carbon Foams Blown with Helium Gas," 43rd International SAMPE Symposium, May 31-Jun. 4, 1998, pp. 756, 758, and 760.
Baker, F. et al., "Activated Carbon," Kirk-Othmer Encyclopedia of Chemical Technology, 4th ed., pp. 1015-1037 (1992).
Fishbach, D.B., "The Kinetics and Mechanism of Graphitization," Chemistry and Physics of Carbon, vol. 7 (1971), Marcel Dekker.
Grujicic, M., et al. "Hypervelocity impact resistance of reinforced carbon-carbon/carbon-foam thermal protection systems," Applied Surface Science, vol. 252, 14, May 15, 2006, pp. 5035-5050 (abstract only).
High Performance Composites, Sep. 2004, p. 25.
Mercuri, R.A., et al., "Modifications of Phenolic Precursor Carbon Foam," Fuel Division of American Chemical Society, 156th Annual Meeting, Proceedings of 9th Carbon Conference, Jun. 16-20, 1969, pp. 206 and 207.
Rogers, D., et al. "Low-Cost Carbon Foams for Thermal Protection and Reinforcement Applications," Touchstone Research Laboratory, pp. 293-305.
Walker, P.L., et al., Chemistry and Physics of Carbon, vol. 1, 1965, Marcel Dekker, Inc., New York, pp. 327-365.
Walker, P.L., et al., Chemistry and Physics of Carbon, vol. 4, 1968, Marcel Dekker, Inc., New York, pp. 286-383.

* cited by examiner

*Primary Examiner* — John S Maples
(74) *Attorney, Agent, or Firm* — Waddey & Patterson, P.C.; James R. Cartiglia

(57) ABSTRACT

A carbon foam battery useful for electrical applications is disclosed which includes a relatively low conductivity low density high porosity carbon foam.

6 Claims, No Drawings

LOW CONDUCTIVITY CARBON FOAM FOR A BATTERY

RELATED APPLICATION

This application is a divisional application of commonly assigned U.S. Ser. No. 11/560,447, now U.S. Pat. No. 7,838,146, filed in the name of Diane M. Artman on Nov. 16, 2006, the disclosure of which is incorporated by reference herein in its entirety.

BACKGROUND OF THE INVENTION

1. Technical Field

The present invention relates to carbon foam for use in batteries. More particularly, the present invention relates to low conductivity carbon foams having improved cell size uniformity and high pore volume, providing for a better lead-acid battery. In addition, the inventive carbon foams have better chemical resistance than graphitic foams and are thus less likely to intercalate, swell, change shape, etc. The invention also includes the cell components of a battery which incorporate low conductivity carbon foam.

2. Background Art

Typical lead acid batteries are the most commonly utilized rechargeable batteries, comprising generally at least one positive element, at least one negative element, and an electrolytic solution. One of the drawbacks of lead acid batteries is that both the positive elements and the negative elements are formed from lead, thereby giving the battery a substantial weight. However, these batteries have maintained popularity as they are relatively low cost and can provide ample power for items such as starter motors for automobiles despite having one of the lowest energy-to-weight ratios of any currently produced battery type.

As noted, the substantial weight of a lead acid battery is due mostly to the lead elements which comprise the positive and negative elements within the battery. These elements function in transferring a current to and from terminals of a battery during both the charging and discharging of the battery. This action is facilitated by a paste within the battery, typically a lead paste, which provides for a chemical reaction which either stores or expends energy as an electric current from the battery.

The standard lead acid battery for an automobile is designed for a 12-volt system, most often including six cells of up to 2.1 volts. The cells contains positive and negative lead elements which function as electrodes, including both lead metal and also lead dioxide. The positive lead electrode in a charged state has paste containing lead dioxide whereas the negative lead electrode can be material such as lead in a sponge formation. The electrolytic solution is most often 6-12 molar sulfuric acid which encompasses both the positive and negative electrodes.

An inherent problem with traditional lead acid batteries is that during the battery's functional life, the lead dioxide is slowly converted into lead sulfate. Lead sulfate is considered a corrosion product and can impede the transfer of electrical energy to the positive electrode. An additional problem of this corrosion is the mechanical effects of the accumulation of the corrosion within the battery. Specifically, lead sulfate will cover the layer of the lead dioxide present on the positive electrode and can continuously compound resulting in a significant volume expansion within the battery, as the lead sulfate corrosion is less dense than other elements of the battery.

This volume expansion within the battery can result in a much less than desired electrical performance as well as poor recharge characteristics. Even more problematic, the volume expansion can impart significant mechanical stress upon the positive electrode resulting in electrode deformation as well as potential cell failure within the battery. As such, the performance of the battery will substantially decrease causing a decrease in the desired service life of the battery.

As a result of the corrosion problem associated with lead acid batteries, various attempts have been made to improve the performance of batteries. One method of improving the durability of a lead acid battery is to provide the positive electrode with improved corrosion resistance. One proposed method of accomplishing this is by using a carbon material for the composition of the positive electrode, as carbon is much less susceptible to oxidation and the resulting corrosion than is lead under the same operating conditions. One such method is described in U.S. Pat. No. 5,512,390 to Obushenko. The Obushenko patent claims this battery is advantageous over traditional lead acid batteries as graphite plates may serve as both positive and negative electrodes resulting in considerable weight savings when compared to a conventional lead acid battery. Furthermore, the battery of the Obushenko patent assertedly does not experience the corrosion associated with the lead electrodes of conventional lead acid batteries.

While the use of carbon instead of lead in a lead acid battery can alleviate many of the problems associated with conventional lead acid batteries, there are problems with specific modes of carbon used within the batteries. The Obushenko patent suffers from the inherent problems associated with graphite, graphite being a relatively flat and dense material with little surface area available for the necessary amount of paste to create the desired electrical performance. Essentially, an increase in the surface area of a carbon element would provide for more energy transfer thus providing for greater electrical discharge and recharge characteristics.

An alternative carbon structure for replacing the lead plates in a lead acid battery is carbon foam.

Carbon foams have attracted considerable interest recently because of their properties of low density, coupled with either very high or low thermal conductivity. Conventionally, carbon foams are prepared by two general routes. Highly graphitizable foams have been produced by thermal treatment of mesophase pitches under high pressure. These foams tend to have high thermal and electrical conductivities. For example, in Klett, U.S. Pat. No. 6,033,506, mesophase pitch is heated while subjected to a pressure of 1000 psi to produce an open-cell foam containing interconnected pores with a size range of 90-200 microns. According to Klett, after heat treatment to 2800° C., the solid portion of the foam develops into a highly crystalline graphitic structure with an interlayer spacing of 0.366 nm. The foam is asserted to have compressive strengths greater than previous foams (3.4 MPa or 500 psi for a density of 0.53 g/cc).

In Hardcastle et al. (U.S. Pat. No. 6,776,936) carbon foams with densities ranging from 0.678-1.5 gm/cc are produced by heating pitch in a mold at pressures up to 800 psi. The foam is alleged to be highly graphitizable and provide high thermal conductivity (250 W/mK).

According to H. J. Anderson et al. in Proceedings of the 43d International SAMPE Meeting, p 756 (1998), carbon foam is produced from mesophase pitch followed by oxidative thermosetting and carbonization to 900° C. The foam has an open cell structure of interconnected pores with varying shapes and with pore diameters ranging from 39 to greater than 480 microns.

Rogers et al., in Proceedings of the 45$^{th}$ SAMPE Conference, pg 293 (2000), describe the preparation of carbon foams from coal-based precursors by heat treatment under high pressure to give materials with densities of 0.35-0.45 g/cc with compressive strengths of 2000-3000 psi (thus a strength/density ratio of about 6000 psi/g/cc). These foams have an open-celled structure of interconnected pores with pore sizes ranging up to 1000 microns. Unlike the mesophase pitch foams described above, they are not highly graphitizable. In a recent publication, the properties of this type of foam were described (High Performance Composites September 2004, pg. 25). The foam has a compressive strength of 800 psi at a density of 0.27 g/cc or a strength to density ratio of 3000 psi/g/cc.

Stiller et al. (U.S. Pat. No. 5,888,469) describes production of carbon foam by pressure heat treatment of a hydrotreated coal extract. These materials are claimed to have high compressive strengths of 600 psi for densities of 0.2-0.4 gm/cc (strength/density ratio of from 1500-3000 psi/g/cc). It is suggested that these foams are stronger than those having a glassy carbon or vitreous nature which are not graphitizable.

Carbon foams can also be produced by direct carbonization of polymers or polymer precursor blends. Mitchell, in U.S. Pat. No. 3,302,999, discusses preparing carbon foams by heating a polyurethane polymer foam at 200-255° C. in air followed by carbonization in an inert atmosphere at 900° C. These foams have densities of 0.085-0.387 g/cc and compressive strengths of 130 to 2040 psi (ratio of strength/density of 1529-5271 psi/g/cc).

In U.S. Pat. No. 5,945,084, Droege described the preparation of open-celled carbon foams by heat treating organic gels derived from hydroxylated benzenes and aldehydes (phenolic resin precursors). The foams have densities of 0.3-0.9 g/cc and are composed of small mesopores with a size range of 2 to 50 nm.

Mercuri et al. (Proceedings of the 9$^{th}$ Carbon Conference, pg. 206 (1969)) prepared carbon foams by pyrolysis of phenolic resins. For foams with a density range of 0.1-0.4 g/cc, the compressive strength to density ratios were from 2380-6611 psi/(g/cc). The pores were ellipsoidal in shape with pore diameters of 25-75 microns) for a carbon foam with a density of 0.25 gm/cc.

Stankiewicz (U.S. Pat. No. 6,103,149) prepares carbon foams with a controlled aspect ratio of 0.6-1.2. The patentee points out that users often require a completely isotropic foam for superior properties with an aspect ratio of 1.0 being ideal. An open-celled carbon foam is produced by impregnation of a polyurethane foam with a carbonizing resin followed by thermal curing and carbonization. The pore aspect ratio of the original polyurethane foam is thus changed from 1.3-1.4 to 0.6-1.2.

In Kelley et al., U.S. Pat. No. 6,979,513, carbon foam is used as an electrode plate within an electrode chemical battery. The carbon foam is conductive 25 μ-ohm-m and made from a wood substrate which is carbonized to form a carbonized wood current collector.

Subsequently, the Kelley et al. patent discloses that a chemically active material may be disposed on the carbonized wood current collector to function as the electrode plate within the battery.

Unfortunately, the carbon foams that have been utilized thus far for electrode chemical batteries, specifically lead acid electrode chemical batteries, leave much room for improvement. The carbon foams generally available are not monolithic and do not have the uniformity, strength and density requirements for such applications. In addition, these foams do not have a high enough porosity or surface area making them ill suited for containment of a chemical paste. Moreover, conventional belief is that a foam material used in battery applications needs to be highly conductive (i.e., have low electrical resistance), and thus must be graphitic or graphitizable.

There is desired, therefore, a carbon foam material which has the controllable cell structure where the cell structure strength, density, and strength-to-density ratio make the foam suitable for use in electrochemical batteries as well as in other applications. Indeed, a combination of characteristics including uniformity, high strength and a lower relative density, even with an electrical resistivity of greater than about 100 μohm-meters have now been found to be useful for an improved electrochemical battery wherein carbon foam is utilized as at least one electrode plate.

SUMMARY OF THE INVENTION

The present invention provides a carbon foam for use in a electrochemical battery which is uniquely capable of improving the battery's performance so that the novel battery can be utilized in a variety of applications including the automotive industry. The inventive foam exhibits a density, compressive strength and compressive strength to density ratio to provide a combination of strength and relatively light weight characteristics not heretofore seen. Moreover, the uniformity of the foam, in terms of the foregoing characteristics also advantageously contributes to its usefulness in an electrochemical battery. Yet another advantage of the inventive foam is its relatively low content of potentially deleterious elements; for instance, the carbon foam of the present invention can contain less than 1 parts per million (ppm) of elements such as iron, calcium, nickel, titanium and vanadium, less than 3 ppm nickel and less than 20 ppm aluminum. In addition, the monolithic nature and bimodal cell structure of the foam, with a combination of larger and smaller pores, which are relatively spherical, provide a carbon foam which can be produced in a desired size and configuration and which can be readily machined.

More particularly, the inventive carbon foam has a density of about 0.05 to about 0.4 grams per cubic centimeter (g/cc), with a compressive strength of at least about 2000 pounds per square inch (psi) (measured by, for instance, ASTM C695). An important characteristic for the foam when intended for use in battery applications is the ratio of strength to density as a lower density allows for a greater amount of paste to be applied. For such applications, a ratio of strength to density of at least about 2500 psi/(g/cc), more particularly at least about 5000 psi/(g/cc), is possible when the density is less than about 0.4 g/cc.

The inventive carbon foam should have a relatively uniform distribution of pores in order to relatively uniformly contain the electrochemical paste. In addition, the pores should be relatively isotropic, by which is meant that the pores are relatively spherical, meaning that the pores have, on average, an aspect ratio of between about 1.0 (which represents a perfect spherical geometry) and about 1.5, more preferably no more than about 1.25. The aspect ratio is determined by dividing the longer dimension of any pore with its shorter dimension.

The foam should have a total porosity of about 65% to about 95%, more preferably about 70% to about 95%. It has been found highly advantageous to have this high porosity as the carbon foam electrodes can contain a greater degree of paste. Preferably, in a bimodal pore distribution embodiment, at least about 90% of the pore volume, more preferably at least about 95% of the pore volume should be the larger size fraction, and from about 2% to about 10% of the pore volume, can be the smaller size fraction.

The larger pore fraction of the bimodal pore distribution in the electrode plate comprising carbon foam should be about 10 to about 150 microns in diameter, more preferably about 15 to about 95 microns in diameter, most preferably about 25 to about 95 microns in diameter. The smaller fraction of pores should comprise pores that have a diameter of about 0.8 to about 3.5 microns, more preferably about 1 to about 2 microns. The bimodal nature of the carbon foam provides an intermediate structure between open-celled foam and closed-cell foam, thus limiting the liquid permeability of the foam while maintaining a foam structure.

Advantageously, to produce the carbon foam for an electrochemical battery, a polymeric foam block, particularly a phenolic foam block, is carbonized in an inert or air-excluded atmosphere, at temperatures which can range from about 500° C., more preferably at least about 800° C., up to about 3200° C. to prepare carbon foams useful in battery applications.

Surprisingly, it has now been found that the novel electrode plate can comprise carbon foam which is considered to be low conductivity. Specifically, the carbon foam utilized has an electrical resistance of at least about 100 μ-ohm-meters. Indeed, the foam can have an electrical resistance of at least about 800 μ-ohm-meters, even at least about 1500 μ-ohm-meters, and still function as an electrode plate. Notably, relatively low electrical conductivity of the carbon foam has little to no effect on the sampling results and performance of the battery.

An object of the invention, therefore, is a carbon foam electrode plate having characteristics which enable it to be employed in battery applications such as lead acid battery applications.

Another object of the invention is a carbon foam electrode plate having the density, strength, and ratio of strength to density sufficient for electrochemical battery applications.

Still another object of the invention is a carbon foam electrode plate having a porosity and cell structure and distribution to provide for an improved performance in battery applications.

Yet another object of the invention is a carbon foam electrode plate which can be produced in a desired size and configuration, and which can be readily machined or joined to provide larger carbon foam structures.

These aspects and others that would become apparent to the artisan upon review of the following description can be accomplished by providing a carbon foam electrode plate formed of a carbon foam having a density of from about 0.05 g/cc to about 0.4 g/cc and a compressive strength of at least about 2000 psi and a porosity of between about 55% and about 95%. The pores of the carbon foam electrode plate have on average an aspect ratio of between about 1.0 and about 1.5. Furthermore, the carbon foam electrode plate can have an electrical resistivity of at least about 100 μ-ohm-meters, thus being relatively nonconductive.

Preferably, at least about 90% of the pore volume of the pores have a diameter of between about 10 and about 150 microns. Advantageously, from about 2% to about 10% of the pore volume of the pores in a bi-model carbon foam embodiment have a diameter of about 1 to about 2 microns.

The carbon foam for use in the electrode plate can be produced by carbonizing a polymer foam article especially a phenolic foam in an inert or air-excluded atmosphere. The phenolic foam should preferably have a compressive strength of at least about 100 psi. Alternatively, the foam can be prepared from a polyurethane precursor. In any event, the foam should, in the preferred embodiment, be non-graphitic and non-graphitizable.

It is to be understood that both the foregoing general description and the following detailed description provide embodiments of the invention and are intended to provide an overview or framework of understanding to nature and character of the invention as it is claimed.

DETAILED DESCRIPTION OF THE PREFERRED EMBODIMENTS

Carbon foams for use as electrode plates in accordance with the present invention can be prepared from polymeric foams, such as polyurethane foams or phenolic foams, with phenolic foams being preferred. Phenolic resins are a large family of polymers and oligomers, composed of a wide variety of structures based on the reaction products of phenols with formaldehyde. Phenolic resins are prepared by the reaction of phenol or substituted phenol with an aldehyde, especially formaldehyde, in the presence of an acidic or basic catalyst. Phenolic resin foam is a cured system composed of open and closed cells. The resins are generally aqueous resoles catalyzed by sodium hydroxide at a formaldehyde: phenol ratio which can vary, but is preferably about 2:1. Free phenol and formaldehyde content should be low, although urea may be used as a formaldehyde scavenger.

The foam for the electrode plate is prepared by adjusting the water content of the resin and adding a surfactant (e.g., an ethoxylated nonionic), a blowing agent (e.g., pentane, methylene chloride, or chlorofluorocarbon), and a catalyst (e.g., toluenesulfonic acid or phenolsulfonic acid). The sulfonic acid catalyzes the reaction, while the exotherm causes the blowing agent, emulsified in the resin, to evaporate and expand the foam. The surfactant controls the cell size as well as the ratio of open-to-closed cell units. Both batch and continuous processes are employed. In the continuous process, the machinery is similar to that used for continuous polyurethane foam. The properties of the foam depend mainly on density and the cell structure.

The preferred phenol is resorcinol, however, other phenols of the kind which are able to form condensation products with aldehydes can also be used. Such phenols include monohydric and polyhydric phenols, pyrocatechol, hydroquinone, alkyl substituted phenols, such as, for example, cresols or xylenols; polynuclear monohydric or polyhydric phenols, such as, for example, naphthols, p.p'-dihydrexydiphenyl dimethyl methane or hydroxyanthracenes.

The phenols used to make the foam starting material can also be used in admixture with non-phenolic compounds which are able to react with aldehydes in the same way as phenol.

The preferred aldehyde for use in the solution is formaldehyde. Other suitable aldehydes include those which will react with phenols in the same manner. These include, for example, acetaldehyde and benzaldehyde.

In general, the phenols and aldehydes which can be used in the process of the invention are those described in U.S. Pat. Nos. 3,960,761 and 5,047,225, the disclosures of which are incorporated herein by reference.

The polymeric foam used as the starting material in the production of the inventive carbon foam should have an initial density which mirrors the desired final density for the carbon foam which is to be used for an electrode plate. In other words, the polymeric foam should have a density of from about 0.1 to about 0.6 g/cc, more preferably of from about 0.1 to about 0.4 g/cc. The cell structure of the polymeric foam should have a porosity of between about 65% and about 95% and a relatively high compressive strength, i.e., on the order of at least about 100 psi, and as high as about 300 psi or higher.

In order to convert the polymeric foam to carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a non-graphitizing glassy carbon foam is obtained, which has the approximate density of the starting polymer foam, but a compressive strength of at least about 2000 psi and, significantly, a ratio of strength to density of at least about 2500 psi/(g/cc), more preferably at least about 5000 psi/(g/cc), while being low conductivity. Furthermore, the carbon foam has a relatively uniform distribution of isotropic pores having, on average, an aspect ratio of between about 1.0 and about 1.5, more preferably between about 1.0 and about 1.25.

The resulting carbon foam for an electrode plate has a total porosity of about 65% to about 95%, and is considered open-celled. In one embodiment, the carbon foam is bimodal with at least about 90%, more preferably at least about 95%, of the pore volume of the pores at about 10 to about 150 microns in diameter while about 2% to about 10%, of the pore volume of the pores are about 0.8 to about 3.5 microns.

The carbon foam used in the electrode plates may function both as a positive electrode and also as a negative electrode plate. Each current collector has an electrical connection point wherein the current is transferred to or from the battery, thus charging and discharging the battery while providing electrical energy to the item for which the battery is used.

In a further embodiment, the electrical connection point can be formed of a conductive material including but not limited to metals, conductive resins, conductive plastics, ceramics, or combinations thereof.

The electrode plate may take on a variety of shapes for use in an electrochemical battery. In a preferred embodiment, the carbon foam element possesses a rectangular body for each respective plate. Depending on the battery type and specific application, a multiplicity of shapes can be made for a corresponding battery. Furthermore, one of the novel features of the inventive carbon foam for electrode plates is the ability to easily machine the carbon foam into a desired configuration. Moreover, in an additional embodiment, phenolic foam precursors can be designed with dimensions corresponding to the desired size and shape of the carbon foam required for the electrode plates.

An additional element needed for the construction of an electrochemical battery is an electrochemical supplement, usually a paste which is in a chemically active state thus providing the necessary means to create electrical energy from chemical energy. The paste is applied to the surface of the carbon foam electrode foam such that the paste penetrates into some of the porosity of the carbon foam. Advantageously, the novel electrode plates created from carbon foam which have evolved from a phenolic foam, has an extremely low density with a very high porosity as well as a high surface area. As such, a greater amount of active paste can be applied to the surfaces of the electrode plate created from the carbon foam than the prior art wood-based carbon foams. Furthermore, the phenolic based carbon foam has the necessary mechanical and structural properties providing for a durable battery while simultaneously having a low density and high surface area so that a desirable amount of reactive paste can be applied to the carbon foam.

Typical reactive paste include oxides of various materials. A standard oxide which has been traditionally used with lead acid batteries is lead oxide, a reactive paste which functions well with carbon foam electrodes. This reactive paste is responsible for the battery's capabilities including both recharging and discharging energy into an electrical system. Furthermore, a variety of additives may be added to the paste to facilitate better chemical transfer as well as mechanical elements to provide for a much longer lifespan of the battery. A further advantage of using the phenolic carbon foam with low density and a high porosity and surface area is that the reactive paste penetrates deeply into the interporsity of the carbon foam electrode plates and thus is much better fixed to the electrode plates than paste in a typical lead acid battery with lead electrodes. This provides for a much more efficient electrical transfer and also increases the battery's durability when subjected to mechanical stresses in that the paste will not easily remove from the carbon foam electrode plate.

The battery also contains an electrolytic solution which corresponds to the particular battery chemistry. Typically lead acid batteries and batteries using a lead oxide active paste utilize an electrolyte of sulfuric acid. Conventional lead acid batteries with lead electrodes typically have an electrolyte of 37% sulfuric acid, which is roughly of from about 6 molar to about 12 molar. In a further embodiment, the electrolytic solution can be of a gel design in which the electrolyte has a substantially higher viscosity than typical sulfuric acid and water solutions. Furthermore, the present invention is not limited to only sulfuric acid solutions as other acids depending on the specific type of battery and the designated reactive paste can be utilized with the novel carbon foam electrode plates.

One embodiment of a working battery with a phenolic-based nonconductive carbon foam comprising the electrode plates is created by inserting the carbon foam plates within the housing and surrounding the plates with the electrolytic solution. Prior to the construction of the battery, the carbon foam electrode plates are typically modified so that there is a positive electrode plate and at least one negative electrode plate. Specifically, when forming the positive electrode plate and the negative electrode plate, each plate is treated differently upon impregnating the plate with a lead paste. For instance, the positive electrode plate can be subjected to conditions so that a portion of the lead oxide paste is converted to lead sulfate. Adjacent to the negative plate, which is often left untreated, there is a phenolic-based carbon foam impregnated with lead oxide paste.

In a functioning battery comprising phenolic-based carbon foam electrodes, as the battery discharges, it creates two chemical reactions. The first reaction includes the negative electrode plates in which an excess of electrons is built with the second reaction on the positive electrode plate experiencing a shortage of electrons. As the battery discharges, the electrons flow to the apparatus in which the battery is providing power and both electrode plates impregnated with a reactive paste build up a sulfate when sulfuric acid is the electrolytic solution. In the case of lead oxide used as a reactive paste, both plates accumulate lead sulfate. Simultaneously, water builds up within the electrolytic solution thus requiring the battery to be recharged for further operation.

As is advantageous with typical lead acid batteries, the above reaction is also reversible for batteries comprised of the novel carbon foam. Thus, during the charging process, the reaction is reversible as the positive plate will accumulate the oxide rather than lead sulfate. Furthermore, the battery formed for the novel electrodes plates constructed of nonconductive, phenolic-based carbon foam can comprise a series of cells. Specifically, each single unit of the battery is considered a cell with the voltage characteristics of the cell determined by the electrochemical reaction occurring within the cell. Yet furthermore, each cell can contain multiple electrode plates of both positive and negative designations ultimately comprising the required voltage to operate the recipient device of the electrical energy.

The advantage of the novel electrode plate comprised of phenolic-based carbon foam are multiple. First, the low density and high surface area combined with the superior strength of the phenolic-based carbon foam provide for a battery which is much less heavy than traditional lead acid batteries while supplying even greater electrical output. Furthermore, the novel electrode plates are more durable with respect to mechanical stresses as the reactive paste impregnated in the porosity of the electrode plates will not separate from their electrode plates as easily under stress when compared to both traditional lead acid batteries and prior art carbon foam batteries. Yet furthermore, the carbon foam of the electrode plates is much more resistant to chemical corrosion than traditional lead electrode plates providing for a much extended service life of the battery containing phenolic-based carbon foam electrode plates. In fact, even as compared to graphitic plates, the inventive carbon foam shows improved chemical resistance, and therefore is less prone to intercalation, swelling, changes in shape, and other deleterious effects which can interfere with performance.

Accordingly, by the practice of the present invention, batteries with electrode plates comprised of phenolic-based carbon foam having heretofore unrecognized characteristics are prepared. These novel carbon foam electrode plates exhibit exceptionally high strength-to-density ratios and have a distinctive porosity, high surface area and low density which make them uniquely effective for electrochemical batteries.

The disclosure of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A battery comprising:
   a) a containment apparatus;
   b) at least two plates;
   c) an electrolytic material in the volume of the containment apparatus; and
   d) an electrochemical supplement on at least one of the plates
   wherein at least one plate containing the electrochemical supplement comprises carbon foam having an electrical resistance of at least about 100 μ-ohm-meters.

2. The battery of claim 1 wherein the carbon foam has an electrical resistance of at least about 1500 μ-ohm-meters.

3. The battery of claim 1 wherein the carbon foam has a density of from about 0.05 g/cc to about 0.4 g/cc.

4. The battery of claim 1 wherein the carbon foam has a porosity of between about 65% and about 95%.

5. The battery of claim 4 wherein at least about 90% of the pore volume of the pores have a diameter of between about 10 and about 150 microns.

6. The battery of claim 5 wherein at least about 95% of the pore volume of the pores have a diameter of between about 25 and about 95 microns.

* * * * *